US011283881B1

(12) United States Patent
Nanda et al.

(10) Patent No.: US 11,283,881 B1
(45) Date of Patent: Mar. 22, 2022

(54) MANAGEMENT AND PROTECTION OF INTERNET OF THINGS DEVICES

(71) Applicant: NortonLifeLock Inc., Tempe, AZ (US)

(72) Inventors: Susanta K Nanda, San Jose, CA (US); Yuqiong Sun, Mountain View, CA (US)

(73) Assignee: NortonLifeLock Inc., Tempe, AZ (US)

( * ) Notice: Subject to any disclaimer, the term of this patent is extended or adjusted under 35 U.S.C. 154(b) by 54 days.

(21) Appl. No.: 15/906,888

(22) Filed: Feb. 27, 2018

(51) Int. Cl.
*H04L 29/08* (2006.01)
*H04W 48/16* (2009.01)
*H04L 29/12* (2006.01)
*H04W 12/06* (2021.01)
*H04W 4/70* (2018.01)
*H04L 67/51* (2022.01)
*H04L 67/12* (2022.01)
*H04L 61/5014* (2022.01)
*H04L 61/4511* (2022.01)

(52) U.S. Cl.
CPC .......... *H04L 67/16* (2013.01); *H04L 61/1511* (2013.01); *H04L 61/2015* (2013.01); *H04L 67/12* (2013.01); *H04W 12/06* (2013.01); *H04W 48/16* (2013.01); *H04W 4/70* (2018.02)

(58) Field of Classification Search
CPC ....... H04W 4/70; H04W 12/06; H04W 48/16; H04L 61/2015
USPC .......................................................... 709/224
See application file for complete search history.

(56) References Cited

U.S. PATENT DOCUMENTS

| 9,626,174 | B2* | 4/2017 | Chylinski | ................. G06F 8/65 |
| 2010/0280867 | A1* | 11/2010 | Diaz | .................. G06Q 30/0201 |
| | | | | 705/7.29 |
| 2014/0095334 | A1* | 4/2014 | Barton | ................... G06Q 30/06 |
| | | | | 705/26.1 |
| 2016/0027399 | A1* | 1/2016 | Wilde | ................... G06F 13/382 |
| | | | | 345/520 |
| 2016/0112374 | A1* | 4/2016 | Branca | ................ H04L 63/0263 |
| | | | | 726/1 |
| 2016/0156614 | A1* | 6/2016 | Jain | ..................... H04L 63/0876 |
| | | | | 726/6 |
| 2016/0315955 | A1* | 10/2016 | Beatty | ................. H04L 63/1416 |

(Continued)

OTHER PUBLICATIONS

Gemalto—Embedded & Cloud Security in the Internet of Things in 2018, https://www.gemalto.com/iot/iot-security. Accessed Mar. 21, 2018.

(Continued)

*Primary Examiner* — Kevin T Bates
*Assistant Examiner* — Chen-Liang Huang
(74) *Attorney, Agent, or Firm* — Holland & Hart LLP

(57) ABSTRACT

A method to manage Internet of Things (IoT) devices is described. In one embodiment, the method includes detecting a presence of a first IoT device in a network associated with the computing device, managing access to the first IoT device based at least in part on authentication information associated with the first IoT device, identifying one or more updates associated with the first IoT device, and applying at least one update to the first IoT device based at least in part on identifying the one or more updates. In one embodiment, the method further includes analyzing a packet stream to determine one or more identifiers associated with the first IoT device, and identifying the first IoT device based at least in part on the one or more determined identifiers.

19 Claims, 9 Drawing Sheets

(56) References Cited

U.S. PATENT DOCUMENTS

| | | | | |
|---|---|---|---|---|
| 2017/0063126 A1* | 3/2017 | Haebler | ............... | G01R 21/133 |
| 2017/0187807 A1* | 6/2017 | Clernon | ................. | H04W 4/70 |
| 2017/0359343 A1* | 12/2017 | Sterl | .................. | H04L 63/0876 |
| 2018/0063851 A1* | 3/2018 | Abraham | .............. | H04W 72/06 |
| 2018/0124544 A1* | 5/2018 | Gupta | .................... | H04L 67/06 |
| 2018/0167228 A1* | 6/2018 | Elcock | ............... | H04L 12/2823 |
| 2018/0295514 A1* | 10/2018 | Brown | ................. | H04W 12/06 |
| 2019/0193653 A1* | 6/2019 | Nakamura | .......... | B60R 16/0232 |
| 2019/0372973 A1* | 12/2019 | Gaonkar | .......... | H04W 12/0609 |

OTHER PUBLICATIONS

Norton—Smart Home Security and the Internet of Things: The Future Is Here, https://us.norton.com/internetsecurity-iot-smart-home-security-core.html. Accessed Mar. 21, 2018.

Symantec—Internet of Things (IoT) Security, https://www.symantec.com/solutions/internet-of-things. Accessed Mar. 21, 2018.

* cited by examiner

MANAGEMENT AND PROTECTION OF INTERNET OF THINGS DEVICES

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

As technology in the home, work place, and public areas continues to develop, the ability to secure and protect user information has become more difficult. In particular, homes have an increasing number of consumer Internet of Things (IoT) devices deployed. With increasing number of IoT devices, it becomes increasingly difficult for a user to keep track of multiple IoT devices and manage them efficiently.

SUMMARY

According to at least one embodiment, a method to manage Internet of Things (IoT) devices is described. In some cases, the present systems and methods may be performed by a computing device that may include one or more processors. In one embodiment, the method may include detecting a presence of a first IoT device in a network associated with the computing device, managing access to the first IoT device based at least in part on authentication information associated with the first IoT device, identifying one or more updates associated with the first IoT device, and applying at least one update to the first IoT device based at least in part on identifying the one or more updates.

In some embodiments, the method may include receiving a packet stream associated with the first IoT device, analyzing the packet stream to determine one or more identifiers associated with the first IoT device, and identifying the first IoT device based at least in part on the one or more determined identifiers.

In some embodiments, the one or more identifiers may include at least one of: a protocol associated with the packet stream, a source media access control (MAC) address associated with the packet stream, a destination MAC address associated with the packet stream, a server address associated with the packet stream, a Domain Name System (DNS) associated with the packet stream, a device certificate associated with the first IoT device, a server certificate associated with the first IoT device, a manufacturer associated with the first IoT device, a type of the first IoT device, or any combination thereof.

In some embodiments, the method may include identifying a Dynamic Host Configuration Protocol (DHCP) request associated with the first IoT device prior to receiving the packet stream, and determining metadata associated with the DHCP request. In some cases, identifying the first IoT device is based at least in part on the determined metadata.

In some embodiments, the method may include identifying a manufacturer associated with the first IoT device based at least in part on the one or more identifiers, determining whether one or more details associated with the manufacturer are stored in the computing device, and in response to determining that the one or more details associated with the manufacturer are not stored in the computing device, querying a database to determine the one or more details associated with the manufacturer.

In some embodiments, the method may include managing access to a second IoT device based at least in part on authentication information associated with the second IoT device. In some cases, the first IoT device may be from a first manufacturer and the second IoT device may be from a second manufacturer different from the first manufacturer.

In some cases, the method may include transmitting a pairing request in the network associated with the computing device, and receiving a response to the pairing request from the first IoT device. In some cases, detecting the presence of the first IoT device is based at least in part on the received response.

In some embodiments, the method may include generating a username and a password associated with the first IoT device, transmitting the generated username and password to a user associated with the first IoT device, receiving, from the user associated with the first IoT device, an access request for the first IoT device. In some cases, the access request may include a username and a password, and providing access to the first IoT device based at least in part on the username and the password included in the received access request matching with the generated username and password.

In some embodiments, the method may include requesting the user associated with the first IoT device to update the username and the password, in response to the request, receiving an updated username and password associated with the first IoT device, and providing access to the first IoT device based at least in part on the username and the password included in the received access request matching with the updated username and password.

In some embodiments, the method may include determining that a threshold time has passed after generating the username and the password associated with the first IoT device, updating the username and the password associated with the first IoT device based at least in part on the determining, and transmitting the updated username and password to the user associated with the first IoT device.

In some embodiments, managing access to the first IoT device may include a 2-factor authentication associated with the first IoT device. In some cases, the computing device managing the first IoT device may be a router agent associated with an intranet, an internet, or both.

In some embodiments, the method may include identifying a current software version and a current firmware version associated with the first IoT device, and monitoring for available updates to the current software version and the current firmware version associated with the first IoT device. In some embodiments, monitoring for available updates may include querying a database to identify the one or more updates associated with the first IoT device.

In some embodiments, the method may include transmitting a notification to a user based at least in part on identifying the one or more updates. In some cases, the notification may include an indication of availability of the one or more updates, and receiving a response from the user, the response may include an approval to apply the at least one update to the first IoT device. In some cases, applying the at least one update may be based at least in part on the received response.

A computing device configured for managing IoT devices is also described. The computing device may include one or more processors and memory in electronic communication with the one or more processors. The memory may store computer executable instructions that when executed by the one or more processors cause the one or more processors to perform the steps of detecting a presence of a first IoT device in a network associated with the computing device, managing access to the first IoT device based at least in part on authentication information associated with the first IoT device, identifying one or more updates associated with the first IoT device, and applying at least one update to the first IoT device based at least in part on identifying the one or more updates.

In some embodiments, the one or more processors may perform the steps of receiving a packet stream associated with the first IoT device, analyzing the packet stream to determine one or more identifiers associated with the first IoT device, and identifying the first IoT device based at least in part on the one or more determined identifiers.

In some embodiments, the one or more identifiers may include at least one of: a protocol associated with the packet stream, a source MAC address associated with the packet stream, a destination MAC address associated with the packet stream, a server address associated with the packet stream, a DNS associated with the packet stream, a device certificate associated with the first IoT device, a server certificate associated with the first IoT device, a manufacturer associated with the IoT device, a type of the first IoT device, or any combination thereof.

In some embodiments, the one or more processors may perform the steps of measuring a time between the first application initially displaying the page of the first application on the display and the second application displaying the page of the second application over the first application, and determining whether the measured time satisfies a predetermined time threshold.

In some embodiments, the one or more processors may perform the steps of identifying a DHCP request associated with the first IoT device prior to receiving the packet stream, and determining metadata associated with the DHCP request. In some cases, identifying the first IoT device is based at least in part on the determined metadata.

A non-transitory computer-readable storage medium storing computer executable instructions is also described. When the instructions are executed by one or more processors, the execution of the instructions may cause the one or more processors to perform the steps of detecting a presence of a first IoT device in a network associated with the computing device, managing access to the first IoT device based at least in part on authentication information associated with the first IoT device, identifying one or more updates associated with the first IoT device, and applying at least one update to the first IoT device based at least in part on identifying the one or more updates.

In some embodiments, the execution of the instructions may cause the one or more processors to perform the steps of receiving a packet stream associated with the first IoT device, analyzing the packet stream to determine one or more identifiers associated with the first IoT device, and identifying the first IoT device based at least in part on the one or more determined identifiers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
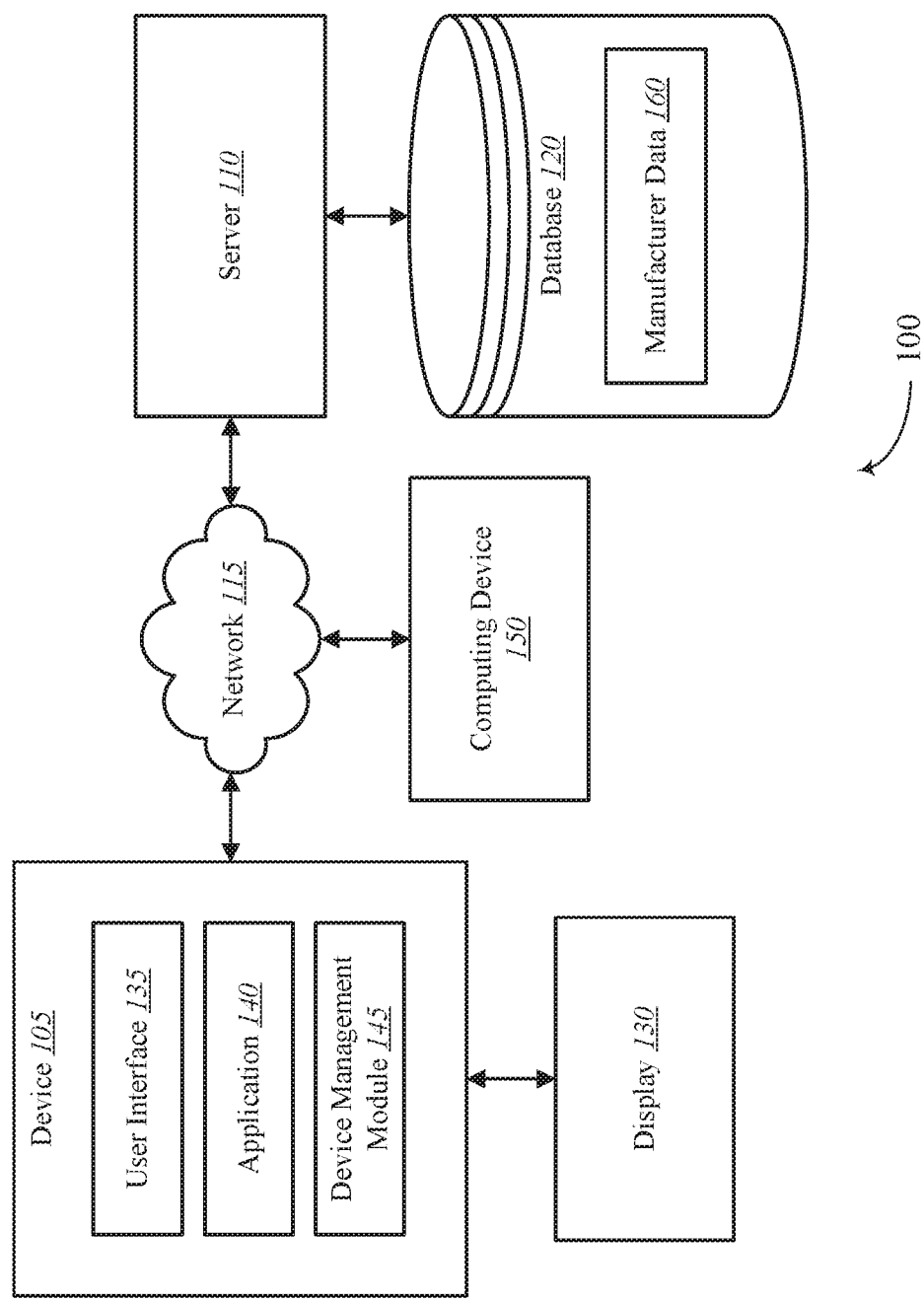
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to managing Internet of Things (IoT) devices. More specifically, the systems and methods described herein relate to managing IoT devices by automating the management and protection of consumer IoT devices while avoiding the need to deploy any host based agents on IoT devices.

Currently, homes have an increased number of consumer IoT devices deployed. In some examples, the number of consumer IoT devices deployed at homes may include Internet Protocol (IP) cameras, printers, smart locks, thermostats, lights, smart plugs, HVAC systems, etc. In such cases, a small fraction of these IoT devices are managed by cloud services. Majority of these devices still rely on a user to manage them. With increasing number of IoT devices, it becomes difficult for a home owner to keep track of all consumer IoT devices and manage them efficiently. Also, home owners often lack the security awareness or the knowledge to manage these consumer IoT devices in a secure way. As an example, homeowners usually forget to update authentication credentials after installing an IoT device, resulting in many consumer IoT devices running with the default username and password. Also, since consumer IoT devices are not equipped to automatically download updates to their software and firmware, large percentage of IoT devices still run with outdated software and firmware. Also, most of these consumer IoT device can connect to the Internet. Thus, these devices often open up sensitive interfaces to public Internet. As a result, consumer IoT devices are often targeted by attacker to hack into homes, build botnets, launch distributed denial of service (DDoS) attacks, etc.

Although a host based security agent may potentially alleviate the drawbacks with the consumer IoT devices, a large percentage of IoT devices still rely on a close or non-standard platform. Such close platforms do not allow a host based security agent. In addition, deploying host based security agents to IoT devices often requires involvement from the home owner. With the increasing variety of IoT devices, managing host based security agents may quickly become cumbersome to the home owners.

The described techniques relate to a method for better managing and protecting consumer IoT devices without depending on any host based agents running on the consumer IoT devices. This described techniques automates the management and protection of consumer IoT devices while avoiding the need to deploy any host based agents on IoT devices.

The described systems and methods include uses a home router based agent to better manage and protect consumer IoT devices connected to home networks. More specifically, the described systems and methods are configured to utilize a software security agent that runs within a home router and a global database (such as a global intelligence service) to automate the tasks of discovery and recognition of consumer IoT devices, and security management of the consumer IoT devices during its lifecycle.

During the discovery and recognition of consumer IoT devices, a home router may detect when a consumer IoT device registers to a network. The purpose of device discovery and recognition is for the home router to identify the consumer IoT device that is connected to the home router. More specifically, the home router may include a software agent to detect a consumer IoT device connected to the home router. In some cases, since the home router is at a vantage point, the agent may be notified when a new device joins the network. In some cases, the agent may be notified when a consumer IoT device requests for an IP via Dynamic Host Configuration Protocol (DHCP). After the agent discovers the device, it may recognize the consumer IoT device. In some examples, the agent may analyze a packet stream from a consumer IoT device to determine one or more identifiers associated with the IoT device.

The agent may recognize the device through either a software based method or a hardware based method. For the software based method, the agent may parse the network traffic produced by the consumer IoT device to determine identifiers associated with the consumer IoT device. Such identifiers may include at least one of: a protocol associated with the packet stream, a source media access control (MAC) address associated with the packet stream, a destination MAC address associated with the packet stream, a server address associated with the packet stream, a Domain Name System (DNS) associated with the packet stream, a device certificate associated with the first IoT device, a server certificate associated with the first IoT device, a manufacturer associated with the IoT device, a type of the first IoT device, or any combination thereof. For the hardware based method, the agent may verify the description label that is provided by the device which is produced and signed by the manufacturer when the device was manufactured. The agent included in the home router may use either approach to identify the consumer IoT device. In some cases, the agent may only cache common device manufacturer information and device types to facilitate the recognition of the consumer IoT devices. In some cases, a global database may maintain a list of IoT devices that may be searched to identify device manufacturer and device types. In some cases, the global database may enable identification of unknown devices or devices not included on the list. Upon identifying an unknown device, the present systems and methods may collect information about the unknown device (e.g., query the device, query a user, etc.) and add the collected information to the global database.

Additionally, during the lifecycle of the device, the agent may automate device management on behalf of a user. In order to automatically manage the consumer IoT devices, the agent may manage the accesses to the device and manage the updates (such as firmware updates and software updates) of the device. Upon recognizing the consumer IoT device, the agent may mandate a credential update to avoid the usage of the default username and password. In such cases, the updated username and password may either be input of a user or randomly produced by the agent. To manage multiple devices at the same time, the agent may also implement a password manager which allows users to retrieve the username and password for individual devices. For devices that do not require credentials to access, the agent may implement an authentication proxy for the device.

In some cases, an authentication page may be displayed to the user and the agent may forward access requests to the consumer IoT devices if the user provides correct credential. To manage the updates of the device, the agent may access corresponding APIs provided by the device to collect firmware and software version after recognition. In some cases, the agent may periodically check with the global database to determine if critical updates are available for an IoT device. Upon identifying a critical update, the agent may notify the user, and if the user approves, the agent may apply the updates to the consumer IoT device on behalf of the user.

Benefits of the present systems and methods include automatically managing consumer IoT devices. The present systems and methods may be configured to automate the management and protection of consumer IoT devices while avoiding the need to deploy any host based agents on IoT devices.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a display 130, a computing device 150, and a network 115 that allows the device 105, the server 110, and the computing device 150 to communicate with one another.

Examples of the device 105 may include any combination of networking devices, mobile devices, smart phones, personal computing devices, computers, laptops, desktops, servers, media content set top boxes, or any combination thereof. Further examples of device 105 may include at least one of a network router, a wired router, a wireless router, network interface controller, wireless network interface controller, a modem, network bridge, network hub, network switch, a multilayer switch, a gateway, a bridge router, a multiplexor, a repeater, a firewall, a proxy server, or any combination thereof.

Examples of computing device 150 may include any combination of a mobile computing device, a laptop, a desktop, a server, a media set top box, or any combination thereof. Examples of server 110 may include at least one of a cloud application server, a remote cloud storage server, a data server, a cloud server, a server associated with an automation service provider, proxy server, mail server, web server, application server, database server, communications server, file server, home server, mobile server, name server, or any combination thereof.

In some configurations, the device 105 may include a user interface 135, application 140, and device management module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, device management module 145, and/or server 110. In some cases, application 140 may include a software application such as an online application accessed via a web browser, a cloud based application, a web based application, a mobile application configured to access the Internet, a desktop application configured to access the Internet, or any combination thereof. In some cases, application 140 may be installed on an external device (not shown) connected to the device 150, and may allow a user to interface with a function of device 105, device management module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a device management module 145. For example, device 105 may include application 140 that allows device 105 to interface with an external machine via device management module 145 located on another device such as computing device 150 and/or server 110. In some embodiments, device 105, and server 110 may include a device management module 145 where at least a portion of the functions of device management module 145 are performed separately and/or concurrently on device 105, and/or server 110. Likewise, in some embodiments, a user may access the functions of device 105 (directly or through device 105 via device management module 145) from computing device 150. For example, in some embodiments, computing device 150 includes a mobile application that interfaces with one or more functions of device 105, device management module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include manufacturer data 160. For example, server 110 may identify conjunction with device 105, a manufacturer associated with a consumer IoT device.

Device management module 145 may enable a computing device to detect a presence of a first IoT device in a network associated with the computing device, manage access to the first IoT device based at least in part on authentication information associated with the first IoT device, identify one or more updates associated with the first IoT device, and apply at least one update to the first IoT device based at least in part on identifying the one or more updates. In some embodiments, device management module 145 may be configured to perform the systems and methods described herein in conjunction with user interface 135 and application 140. User interface 135 may enable a user to interact with, control, and/or program one or more functions of device management module 145. Further details regarding the device management module 145 are discussed below.

Figure 2:
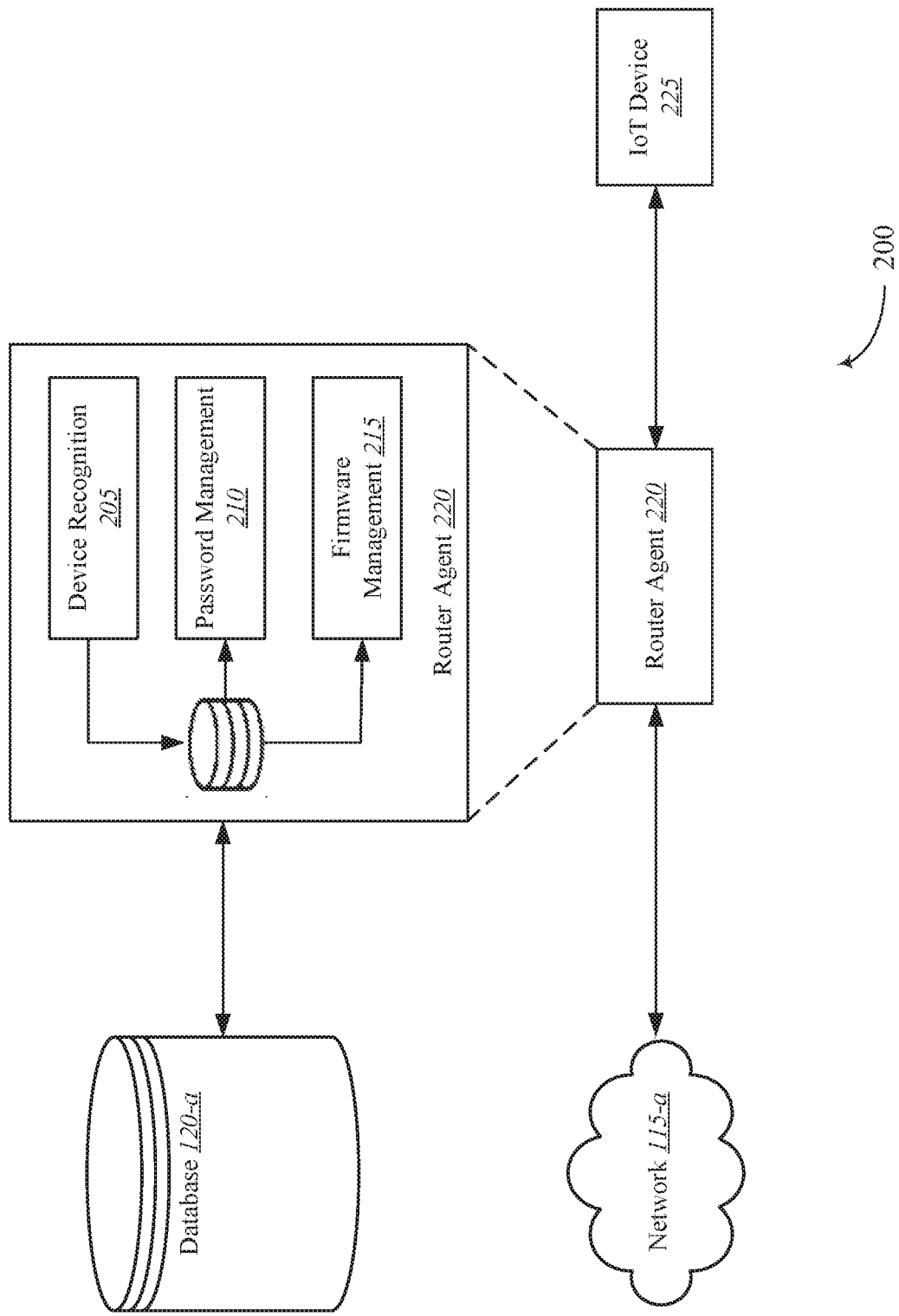
FIG. 2 is a block diagram illustrating one embodiment of an environment in which the present systems and methods may be implemented.

FIG. 2 is a block diagram illustrating one embodiment of an environment 200 in which the present systems and methods may be implemented. In some embodiments, the systems and methods described herein may be performed using router agent 220. As depicted, in the environment 200, the router agent may be connected to the IoT device 225 and network 115-*a*. The network 115-*a* may be an example of network 115 as described with reference to FIG. 1. In some examples, the router agent 220 may include a device recognition block 205, a password management block 210, and a firmware management block 215.

The methods described in this figure relate to managing IoT devices. As previously described, the device recognition block 205 may be configured to detect a presence of an IoT device 225 in a network 115-*a* associated with the router agent 220. In some cases, the device recognition block 205 may analyze a packet stream received from the IoT device 225 to determine one or more identifiers associated with the IoT device 225. In some cases, the one or more identifiers may include at least one of: a protocol associated with the packet stream, a source MAC address associated with the packet stream, a destination MAC address associated with the packet stream, a server address associated with the packet stream, a DNS associated with the packet stream, a device certificate associated with the IoT device, a server certificate associated with the IoT device, a manufacturer associated with the IoT device, a type of the IoT device, or any combination thereof. In some cases, the device recognition block 205 may determine whether one or more details associated with the IoT device 225 are stored in the router agent 220. In response to determining that the one or more details associated with the IoT device 225 are not stored in the router agent 220, the device recognition block 205 may query database 120-*a* to determine the one or more details associated with the IoT device 225. In some cases, device recognition block 205 may query the IoT device 225 for information and/or a user for information regarding the IoT device 225. In some cases, device recognition block 205 may query database 120-*a* for information regarding a manufacturer of IoT device 225.

Upon identifying the IoT device, password management block 210 may be configured to manage access to the IoT device 225 based on authentication information associated with the IoT device 225. More specifically, the password management block 210 may generate a username and a password associated with the IoT device 225 and transmit the generated username and password to a user associated with the IoT device 225. In some cases, the password management block 210 may receive an access request for the IoT device 225 from the user associated with the IoT device 225. In some cases, the access request may include a username and a password. In some examples, the password management block 210 may provide access to the first IoT device 225 based on the username and the password included in the received access request matching with the generated username and password.

In some cases, firmware management block 215 may monitor for available updates to a current software version and a current firmware version associated with the IoT device 225. In some examples, the firmware management block 215 may query database 120-*a* to identify the one or more updates associated with the IoT device 225. In some cases, the firmware management block 215 may apply at least one update to the IoT device 225 based on identifying the one or more updates.

Figure 3:
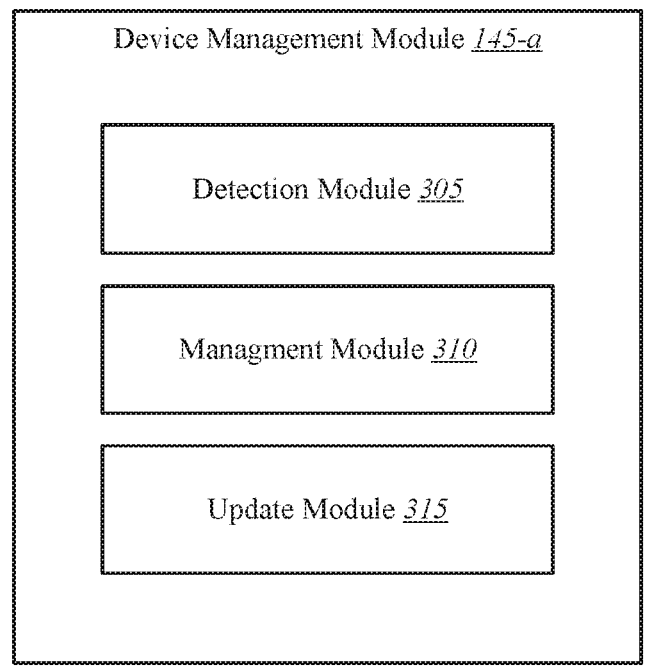
FIG. 3 is a block diagram illustrating one example of a device management module.

FIG. 3 is a block diagram illustrating one example of a device management module 145-a. Device management module 145-a may be one example of device management module 145 depicted in FIG. 1. As depicted, device management module 145-a may include detection module 305, management module 310, and update module 315.

In some embodiments, at least a portion of device management module 145 may be implemented in an application on a router, a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, detection module 305 may be configured to detect a presence of an IoT device in a network associated with the computing device. In some examples, the detection module 305 may monitor for IoT devices connected to a network. For example, the detection module 305 may be included in a router agent. In some examples, the detection module 305 may receive a packet stream associated with the first IoT device. In some cases, the detection module 305 may detect that an IoT device is connected to a network upon receiving the packet stream. In some examples, the detection module 305 may analyze the packet stream to determine one or more identifiers associated with the first IoT device. As one example, the purpose of discovery and recognition of IoT devices is for the detection module 305 to identify the IoT devices connected to a home router. In some examples, identifiers associated with IoT devices may include at least one of: a protocol associated with the packet stream, a source MAC address associated with the packet stream, a destination MAC address associated with the packet stream, a server address associated with the packet stream, a DNS associated with the packet stream, a device certificate associated with the first IoT device, a server certificate associated with the first IoT device, a manufacturer associated with the IoT device, a type of the first IoT device, or any combination thereof.

In some examples, the detection module 305 may be configured to identify one or more IoT devices based on the identifiers associated with the one or more IoT devices. For example, the detection module 305 may receive an indication that a new IoT device has been connected to a home network, the detection module 305 may determine identification factors associated with the newly connected IoT device. In some examples, the detection module 305 may send a notification to a user notifying that a new IoT device has been identified. In some cases, the notification may be provided through an application installed in a user device. In some examples, the device may be an example of device 105 as described with reference to FIG. 1.

In some embodiments, the detection module 305 may be configured to identify a manufacturer associated with an IoT device. As one example, the detection module 305 may be configured to identify a manufacturer associated with the IoT device based on the one or more identifiers. In some examples, upon identifying the manufacturer, the detection module 305 may be configured to determine details associated with the manufacturer. For example, the detection module 305 may be configured to determine a manufacturer name, a model number associated with the first IoT device, a serial number associated with the first IoT device, or a combination thereof. In one example, the detection module 305 may determine that manufacturer information associated with an IoT device is stored within a device that may include the detection module 305. In some cases, the device may be an example of device 105 described with reference to FIG. 1. In some cases, the device may not have the manufacturer information stored in a local memory. In such cases, the detection module 305 may be configured to query an external database to determine manufacturer information associated with an IoT device. In some cases, the database queried by the detection module 305 may be an example of database 120 as discussed with reference to FIG. 1.

In some embodiments, management module 310 may be configured to manage access to an IoT device based on authentication information associated with the IoT device. As one example, the management module 310 may receive an indication of identification of an IoT device from the detection module 305. For example, the detection module 305 may receive an indication of an IoT device being connected to a network. For example, the IoT device may register to a network shared by a device including the detection module 305 and the IoT device. Upon detecting the presence of an IoT device, the detection module 305 may determine details associated with the IoT device. In some cases, the detection module 305 may be configured to identify one or more IoT devices. Upon receiving details associated with one or more IoT devices, the detection module 305 may be configured to forward the details to the management module 310. In some examples, the management module 310 may manage access to a first IoT device based on authentication information associated with the first IoT device and a second IoT device based on authentication information associated with the second IoT device. In some cases, the first IoT device may be from a first manufacturer and the second IoT device may be from a second manufacturer different from the first manufacturer. For example, the management module 310 may simultaneously manage access to multiple IoT devices belonging to different manufacturers.

In some examples, the management module 310 may be configured to generate a username and a password associated with a first IoT device. For example, upon receiving details associated with the first IoT device, the management module 310 may be configured to generate a default username and a default password for the first IoT device. In some examples, the management module 310 may transmit the generated username and password to a user associated with the first IoT device. As an example, the management module 310 may be configured to transmit the default username and password to the user via a user device. In some cases, the user device may be an example of device 105 described with reference to FIG. 1. In some examples, the management module 310 may be configured to transmit the default username and password as an email notification, a text notification, a notification via an application hosted on the user device, a phone call, or a combination thereof. In some cases, the application hosted on the user device may be hosted on an operating system running on the user device.

Additionally or alternatively, the management module 310 may be configured to receive, from the user associated with the first IoT device, an access request for the first IoT device. In some cases, the access request may include a username and a password. For example, the user may use an application running on a user device to access the first IoT device. In one example, the first IoT device may be a programmable thermostat. The user may request to access the programmable thermostat. Upon receiving the request, the management module 310 may determine whether there are any username or password associated with the requested IoT device. Upon determining that the requested IoT device is associated with authentication credentials (such as default username and password, etc.), the management module 310 may provide access to the first IoT device based on the username and the password included in the received access request matching with the default username and password. As an example, upon receiving the access request from a user, the management module 310 may provide the user with an option to enter a username and a password. If the username and password entered by the user matched with the authentication information associated with IoT device, then the management module 310 may be configured to grant access of the first IoT device to the user.

In some embodiments, management module 310 may be configured to update authentication information associated with an IoT device according to a user request. Referring to the prior example, the management module 310 may be configured to request the user associated with the IoT device to update the username and the password. In some cases, the management module 310 may receive a request from a user indicating that the user is willing to update authentication information (such as username and password) associated with the IoT device. In some cases, in response to the request, the management module 310 may produce a user interface to receive updated authentication information from the user. In some examples, the management module 310 may receive an updated username and password associated with the IoT device. In some cases, the management module 310 may receive the updated username and password in response and the management module may overwrite the prior authentication information with the newly received username and password. In some cases, the user may include some additional authentication information. After receiving the updated authentication information from a user, when the user requests to access the IoT, the management module 310 may determine whether there are any username or password associated with the requested IoT device. In some cases, the management module 310 may determine that the requested IoT device is associated with the updated username and password. Thus, upon receiving the access request, the management module 310 may provide access to the IoT device based on the username and the password included in the received access request matching with the updated username and password. Further, in some cases, the management module 310 may determine that a threshold time has passed after generating the username and the password associated with the IoT device. In some cases, the management module 310 may determine that a threshold time has passed after a last update of a username and password associated with the IoT device. Upon determining that the threshold time has passed, the management module 310 may be configured to update authentication information associated with the IoT device. As an example, the management module 310 may be configured to update the username and password associated with the IoT device. Additionally, the management module 310 may transmit the updated username and password to the user associated with the IoT device.

In some examples, the management module 310 may manage access to one or more IoT devices using a 2-factor authentication associated with the one or more IoT devices. In some cases, the computing device managing the one or more IoT devices may be a router agent associated with an intranet, an internet, or both. In some examples, the management module 310 may identify a current software version and a current firmware version associated with an IoT device and monitor for available updates to the current software version and the current firmware version associated with the IoT device. For example, the management module 310 may identify a current software version and a current firmware version of an IoT device based on a manufacturer information associated with the IoT device. In some examples, as part of monitoring for updates to the current software version and the current firmware version, the management module 310 may query a database to identify one or more updates associated with the IoT device. In some cases, the database may be an example of the database 120 as described with reference to FIG. 1 or database 120-a as described with reference to FIG. 2.

In some examples, management module 310 may identify an available update for the current software or the current firmware of an IoT device. Upon determining an available update, the management module 310 may notify the update module. In some cases, the management module 310 may be configured to download the updates from the database (such as database 120) and send the downloaded update to the update module 315. Upon receiving an indication that an update is available, in some cases, the update module 315 may transmit a notification to a user based on identifying the one or more updates. In some examples, the notification may be transmitted to a registered user of the IoT device. In some cases, a user may be registered when a new IoT device is detected in a network. In some examples, the update module 315 may transmit the notification for display on a device of a user associated with the IoT device. In some cases, the device may be example of a device 105 as described with reference to FIG. 1. In some examples, the notification may include an indication of availability of the one or more updates. For example, the update module 315 may notify a user of one or more updates available for download. In some cases, an approval from the user may be received prior to installation of the one or more available updates. More specifically, the update module 315 may receive a response from the user. In some cases, the response may include an approval to apply at least one update to the IoT device. In some cases, the update module 315 may then apply the at least one update is based on the received response.

Figure 4:
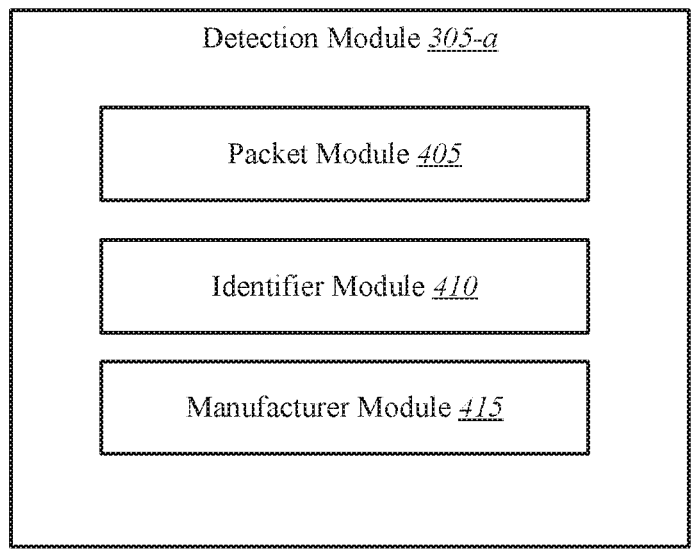
FIG. 4 is a block diagram illustrating one example of a detection module.

FIG. 4 is a block diagram illustrating one example of a detection module 305-a. The detection module 305-a may be an example of detection module 305 from FIG. 3. As depicted, detection module 305-a may include packet module 405, identifier module 410, and manufacturer module 415.

In some embodiments, at least a portion of detection module 305-a may be implemented in an application on a router agent, a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, packet module 405 may be configured to detect a presence of an IoT device in a network associated with the computing device. In one example, the packet module 405 may be included in a router agent. In such cases, the router agent may monitor for IoT devices connected to a network. For example, the packet module 405 may receive a packet stream associated with the IoT device. For example, the packet module 405 may be notified when a new device joins the network. In some cases, a new IoT device upon joining the network may request an IP via DHCP. More specifically, the packet module 405 may identify a DHCP request associated with the IoT device prior to receiving the packet stream. Upon identifying the DHCP request, the packet module 405 may determine metadata associated with the DHCP request. In some cases, the packet module 405 may be configured to parse the DHCP request to identify the metadata associated with the DHCP request. Upon identifying the metadata, in some cases, the packet module 405 may forward the metadata to the identifier module 410. In some cases, identifying the first IoT device may be based at least in part on the determined metadata.

In some examples, the packet module 405 may be configured to transmit a pairing request in the network. In some cases, as part of an active probing process, the packet module 405 may transmit a pairing request. In some cases, the packet module 405 may receive a response to the pairing request from an IoT device. In some examples, the packet module 405 may detect the presence of the IoT device based on the received response. In some examples, after the IoT device is detected, the packet module 405 may be configured to recognize the detected IoT device. In one example, the packet module 405 may be configured to recognize an IoT device through a software based method. In some cases, the software based method may include parsing the network traffic produced by the IoT device to recognize the IoT device. In some cases, the software based method may be compatible with most existing devices. In some examples, the packet module 405 may employ a hardware based method to identify an IoT device.

In some cases, the packet module 405 may analyze the packet stream to determine one or more identifiers associated with the IoT device. For example, upon analyzing the packet stream, the packet module 405 may be configured to detect that an IoT device is connected to a network. In one example, the purpose of discovery and recognition of IoT devices is for the packet module 405 to identify the IoT devices connected to a home router. In some cases, the packet module 405 may parse the received packet stream to identify one or more IoT devices connected to the network.

In some examples, the packet module 405 may be configured to transmit the analyzed packet stream to identifier module 410. In some examples, the identifier module 410 may be configured to identify an IoT device in a network based on the analyzed traffic produced by the IoT device. For example, the identifier module 410 may identify one or more identifiers associated with an IoT device based on the analyzed packet stream. In some cases, the identifiers associated with IoT devices may include at least one of: a protocol associated with the packet stream, a source MAC address associated with the packet stream, a destination MAC address associated with the packet stream, a server address associated with the packet stream, a DNS associated with the packet stream, a device certificate associated with the first IoT device, a server certificate associated with the first IoT device, a manufacturer associated with the IoT device, a type of the first IoT device, or any combination thereof.

In some examples, the identifier module 410 may be configured to identify one or more IoT devices based on the identifiers associated with the one or more IoT devices. In some cases, the identifier module 410 may receive an indication that a new IoT device has been connected to a network. Upon receiving the indication, the identifier module 410 may determine identification factors associated with the newly connected IoT device. In some examples, the identifier module 410 may send a notification to a user notifying that a new IoT device has been identified. In some cases, the notification may be provided through an application installed in a user device. In some examples, the device may be an example of device 105 as described with reference to FIG. 1.

As previously discussed, in hardware based identification, manufacturer module 415 may be configured to verify a description label associated with the IoT device. In some cases, the description label may be produced and signed by a vendor when the device was manufactured. In some embodiments, the manufacturer module 415 may be configured to identify a manufacturer associated with an IoT device. For example, the manufacturer module 415 may determine details associated with the manufacturer of the IoT device. In some examples, the manufacturer module 415 may be configured to identify a manufacturer associated with the IoT device based on the one or more identifiers. For example, the identifier module 410 may transmit the identifiers associated with an IoT device to the manufacturer module 415. In some cases, upon receiving the identifiers, the manufacturer module 415 may identify a manufacturer associated with at least one IoT device based on the received identifiers. In some cases, the manufacturer module 415 may be configured to identify multiple manufacturers associated with one or more IoT devices.

In some examples, upon identifying the manufacturer, the manufacturer module 415 may be configured to determine details associated with the manufacturer. For example, the manufacturer module 415 may determine a manufacturer name, a model number associated with the IoT device, a serial number associated with the IoT device, or a combination thereof. In some cases, the manufacturer module 415 may identify a manufacturer and may determine whether any details associated with the manufacturer are stored in a storage associated with the manufacturer module 415. In one example, in response to determining that the one or more details associated with the manufacturer are not stored in the storage associated with the manufacturer module 415, the manufacturer module 415 may query a database to determine one or more details associated with the manufacturer. In some cases, the database queried by the detection module 305 may be an example of database 120 as discussed with reference to FIG. 1. In some examples, a storage associated with the manufacturer module 415 may be configured to cache details associated with common manufacturers. In some cases, upon identifying a manufacturer of an IoT device, the manufacturer module 415 may determine whether the manufacturer is a common manufacturer. When the manufacturer module 415 determines that the identified manufacturer is a common manufacturer, then the manufacturer module 415 may query a local storage for details associated with the identified manufacturer. On the other hand, when the manufacturer module 415 determines that the identified manufacturer is not a common manufacturer, then the manufacturer module 415 may directly query the database without querying the local storage.

Figure 5:
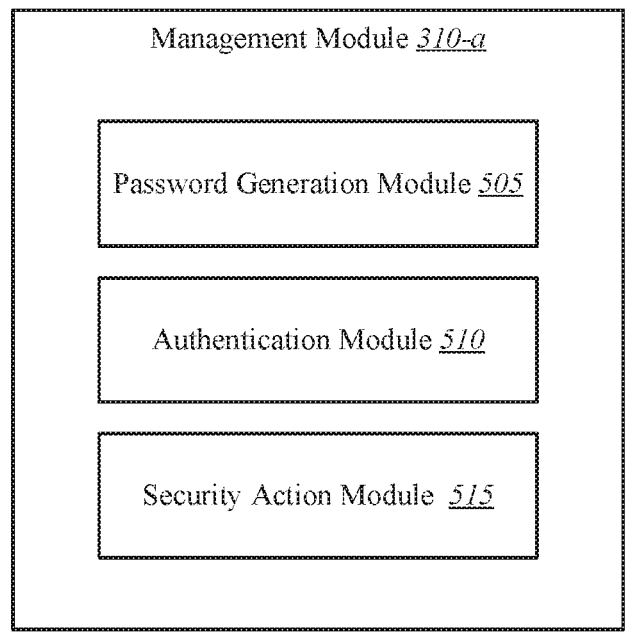
FIG. 5 is a block diagram illustrating one example of a management module.

FIG. 5 is a block diagram illustrating one example of a management module 310-*a*. The management module 310-*a* may be an example of management module 310 from FIG. 3. As depicted, management module 310-*a* may include password generation module 505, authentication module 510, and security action module 515.

In some embodiments, at least a portion of management module 310-*a* may be implemented in an application on a router agent, a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In some embodiments, password generation module 505 may be configured to manage access to an IoT device. In some cases, the password generation module 505 may be configured to manage access to the IoT device based on authentication information associated with the IoT device. As one example, the password generation module 505 may receive an indication of identification of an IoT device from the detection module 305. In some cases, the identification information may include at least one of: a protocol associated with the packet stream, a source MAC address associated with the packet stream, a destination MAC address associated with the packet stream, a server address associated with the packet stream, a DNS associated with the packet stream, a device certificate associated with the first IoT device, a server certificate associated with the first IoT device, a manufacturer associated with the IoT device, a type of the first IoT device, or any combination thereof.

In some examples, the password generation module 505 may receive an indication that an IoT device is connected to a network. Upon determining the IoT device, in some examples, the password generation module 505 may automate a device management on behalf of a user associated with the IoT device. For example, the password generation module 505 may manage access to multiple IoT devices without active participation from a user of the IoT devices. In some cases, the password generation module 505 may be configured to receive an indication identifying one or more IoT devices. For example, the identifier module 410 may be configured to send details associated with the plurality of IoT devices to the password generation module 505. Upon receiving the details associated with the plurality of IoT devices, the password generation module 505 may manage access to the plurality of IoT devices. More specifically, the password generation module 505 may manage access to a first IoT device based on authentication information associated with the first IoT device and a second IoT device based on authentication information associated with the second IoT device. In some cases, the first IoT device may be from a first manufacturer and the second IoT device may be from a second manufacturer different from the first manufacturer. For example, the password generation module 505 may simultaneously manage access to multiple IoT devices belonging to different manufacturers.

In some cases, upon recognizing an IoT device, the password generation module 505 may mandate a credential update to avoid the usage of a default username and password. In some cases, an IoT device may not use any username and password. In such cases, the password generation module 505 may be configured to generate a username and a password associated with a first IoT device. For example, upon receiving details associated with the first IoT device, the password generation module 505 may be configured to generate a default username and a default password for the first IoT device, In some cases, the password generation module 505 may be configured to simultaneously generate default usernames and passwords for multiple IoT devices.

In some examples, the password generation module 505 may be configured to transmit the generated username and password to a user associated with an IoT device. For example, upon generating default usernames and passwords for one or more IoT devices, the password generation module 505 may transmit the default username and password to one or more users associated with the one or more IoT devices. A user of an IoT device may be a registered user of the IoT device. In some cases, multiple users may be authorized to access an IoT device. In some cases, the password generation module 505 may be configured to transmit the default username and password to the user via a user device. In some cases, the user device may be an example of device 105 described with reference to FIG. 1. In some examples, the password generation module 505 may be configured to transmit the default username and password as an email notification, a text notification, a notification via an application hosted on the user device, a phone call, or a combination thereof.

In some cases, the password generation module 505 may be configured to store the default username and password. The password generation module 505 may also send the authentication information (such as username and password) to the authentication module 510. In some cases, the authentication module 510 may be configured to receive an access request for an IoT device. In some cases, the access request may include a username and a password. For example, the user may use an application running on a user device to access the IoT device.

In some cases, the authentication module 510 may display an authentication page prior to providing access to the requested IoT device. In one example, the IoT device may be a programmable thermostat or a smart doorbell. The user may request to access the programmable thermostat or the smart doorbell to update one or more settings of the IoT devices. Upon receiving the request, authentication module 510 may determine whether there are any username or password associated with the requested IoT device. Upon determining that the requested IoT device is associated with authentication credentials (such as default username and password), authentication module 510 may provide access to the IoT device based on the username and the password included in the received access request matching with the default username and password. For example, the authentication module 510 may display an authentication screen prior to providing access to the requested IoT device. In some examples, the authentication module 510 may be configured to receive, from the user, authentication information associated with the requested IoT device. When the username and password entered by the user matched with the authentication information associated with IoT device, then the authentication module 510 may be configured to grant access of the IoT device to the user.

In some embodiments, the password generation module 505 may further be configured to update authentication information associated with an IoT device according to a user request. For example, the password generation module 505 may be configured to request the user associated with the IoT device to update the username and the password. In some examples, the password generation module 505 may periodically remind a user to update the authentication credentials associated with one or more IoT devices. In some cases, the password generation module 505 may receive a request from a user indicating to update authentication information (such as username and password) associated with the IoT device. In some examples, in response to the request, the password generation module 505 may produce a user interface to receive updated authentication information from the user. In some examples, the password generation module 505 may receive an updated username and password associated with the IoT device via a user interface displayed on a user device. In some cases, the user device may be an example of device 105 as descried with reference to FIG. 1.

In some examples, the password generation module 505 may be configured to receive an updated username and an updated password in response to the user's request to update existing authentication credentials associated with an IoT device. In some cases, upon receiving the updated authentication information, the password generation module 505 may overwrite the prior authentication information with the newly received username and password. In some cases, apart from username and password, the user may include some additional authentication information (such as security questions, security picture, etc.).

In some examples, a user may request access to an IoT after updating the authentication information associated with the IoT. In some cases, the password generation module 505 may transmit the updated authentication information to the authentication module 510. When a user requests to access the IoT after updating the authentication credentials, the authentication module 510 may determine that the requested IoT device is associated with the updated username and password. Upon receiving the access request, the authentication module 510 may provide access to the IoT device based on the username and the password included in the received access request matching with the updated username and password. In some examples, the authentication module 510 may manage access to one or more IoT devices using a 2-factor authentication associated with the one or more IoT devices. In some cases, the computing device managing the one or more IoT devices may be a router agent associated with an intranet, an internet, or both.

Additionally or alternatively, the password generation module 505 may determine that a threshold time has passed after generating the username and the password associated with the IoT device (such as default username and password, and updated username and password). In some cases, the password generation module 505 may determine that a threshold time has passed after a last update of a username and password associated with the IoT device. Upon determining that the threshold time has passed, the password generation module 505 may be configured to update authentication information associated with the IoT device. As an example, the password generation module 505 may be configured to update the username and password associated with the IoT device. Additionally, the password generation module 505 may transmit the updated username and password to the user associated with the IoT device.

In some examples, the authentication module 510 may further identify a current software version and a current firmware version associated with an IoT device and monitor for available updates to the current software version and the current firmware version associated with the IoT device. In some examples, as part of monitoring for updates to the current software version and the current firmware version, the authentication module 510 may query a database to identify one or more updates associated with the IoT device. In some cases, the database may be an example of the database 120 as described with reference to FIG. 1 or database 120-*a* as described with reference to FIG. 2. In some examples, the authentication module 510 may further determine ratings associated with an IoT device. For example, the authentication module 510 may query a database to determine a rating associated with an IoT device.

In some examples, security action module 515 may perform a security action based at least in part on receiving invalid authentication credentials associated with an IoT device. In some cases, the security action may include blocking access to the IoT device. In some embodiments, security action module 515 may be configured to terminate a connection associated with the IoT device based on detecting an invalid authentication attempt.

Figure 6:
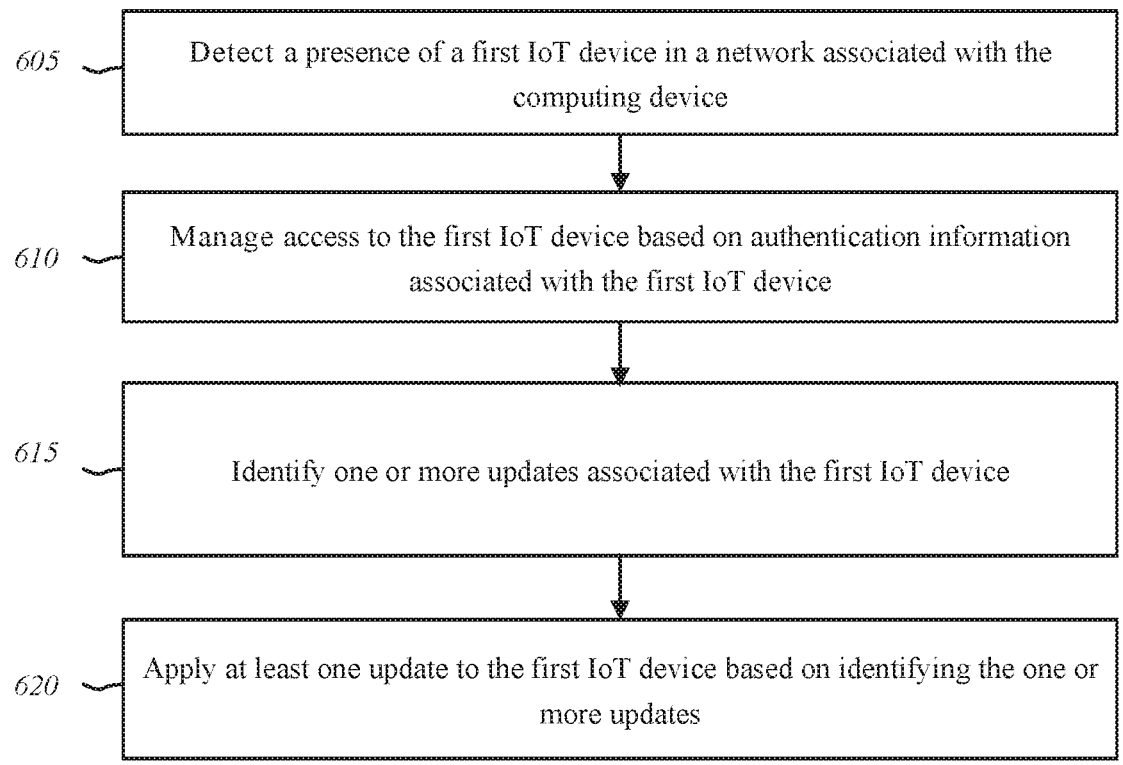
FIG. 6 is a flow diagram illustrating one embodiment of a method in accordance with various aspects of this disclosure.

FIG. 6 is a flow diagram illustrating one embodiment of a method 600 to manage IoT devices. In some configurations, the method 600 may be implemented by the device management module 145 illustrated in FIGS. 1, 2, 3, 4, and/or 5. In some configurations, the method 600 may be implemented in conjunction with device 105, server 110, network 115, database 120, components thereof, or any combination thereof.

At block 605, method 600 may include detecting a presence of a first IoT device in a network associated with the computing device. In some cases, a router agent may detect a presence of the first IoT device based on a packet stream received from the first IoT device. For example, the router agent may receive the packet stream and analyze the packet stream to determine identifiers associated with the first IoT device. In some cases, the identifiers may include at least one of: a protocol associated with the packet stream, a source MAC address associated with the packet stream, a destination MAC address associated with the packet stream, a server address associated with the packet stream, a DNS associated with the packet stream, a device certificate associated with the first IoT device, a server certificate associated with the first IoT device, a manufacturer associated with the IoT device, a type of the first IoT device, or any combination thereof.

At block 610, method 600 may include managing access to the first IoT device based on authentication information associated with the first IoT device. As part of managing access, the router agent may manage usernames and passwords associated with the first IoT device. In some cases, the router agent may be configured to automatically change user passwords periodically and then push the updated credentials to a user associated with the first IoT device. In some cases, the router agent may be associated with a password storage application in device associated with the user. The password storage application may be configured to periodically update usernames and passwords for the user.

At block 615, method 600 may include identifying one or more updates associated with the first IoT device. In some examples, after identifying an IoT device, the router agent may determine a current version of the software and firmware installed in the IoT device. In some examples, the router agent may monitor for available updates to the current software version and the current firmware version. In some cases, the router agent may monitor updates periodically. At block 620, method 600 may include applying at least one update to the first IoT device based at least in part on identifying the one or more updates. In some cases, prior to applying, the router agent may transmit a notification to a user based on identifying one or more updates to the current software version and the current firmware version. In some cases, the notification may include an indication of availability of the one or more updates.

Figure 7:
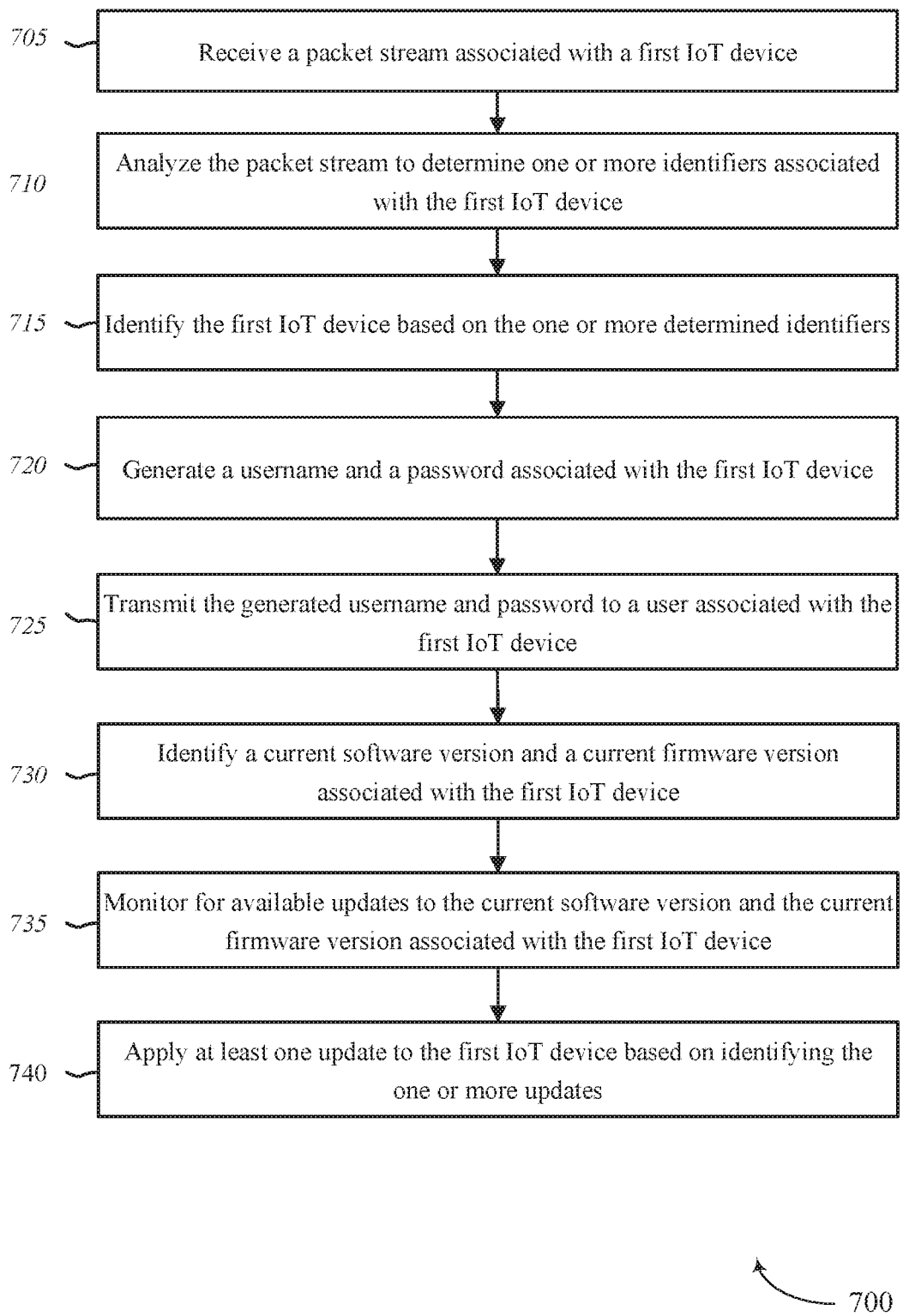
FIG. 7 is a flow diagram illustrating one embodiment of a method in accordance with various aspects of this disclosure.

FIG. 7 is a flow diagram illustrating one embodiment of a method 700 to manage IoT devices. In some configurations, the method 700 may be implemented by the device management module 145 illustrated in FIGS. 1, 2, 3, 4, and/or 5. In some configurations, the method 700 may be implemented in conjunction with device 105, server 110, network 115, database 120, components thereof, or any combination thereof.

At block 705, method 700 may include receiving a packet stream associated with a first IoT device. At block 710, method 700 may include analyzing the packet stream to determine one or more identifiers associated with the first IoT device. At block 715, method 700 may include identifying the first IoT device based on the one or more determined identifiers. At block 720, method 700 may include generating a username and a password associated with the first IoT device. At block 725, method 700 may include transmitting the generated username and password to a user associated with the first IoT device. At block 730, method 700 may include identifying a current software version and a current firmware version associated with the first IoT device. At block 735, method 700 may include monitoring for available updates to the current software version and the current firmware version associated with the first IoT device. At block 740, method 700 may include applying at least one update to the first IoT device based at least in part on identifying the one or more updates.

Figure 8:
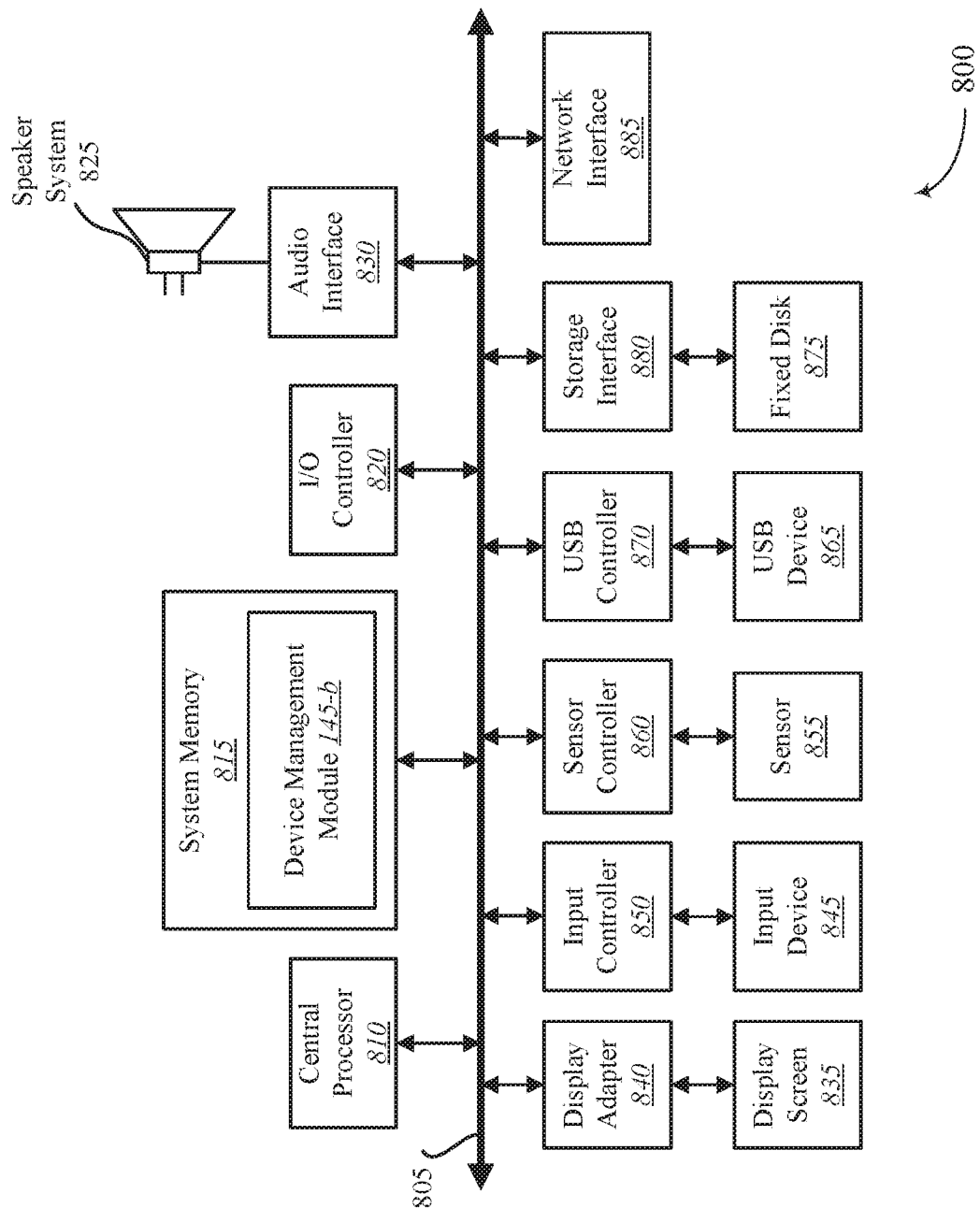
FIG. 8 depicts a block diagram of a computer system suitable for implementing the present systems and methods.

FIG. 8 depicts a block diagram of a computing device 800 suitable for implementing the present systems and methods. The device 800 may be an example of device 105, computing device 150, and/or server 110 illustrated in FIG. 1. In one configuration, device 800 includes a bus 805 which interconnects major subsystems of device 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the device management module 145-b to implement the present systems and methods may be stored within the system memory 815. Applications (e.g., application 140) resident with device 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via interface 885.

Storage interface 880, as with the other storage interfaces of device 800, can connect to a standard computer readable medium for storage and/or retrieval of information, such as a fixed disk drive 875. Fixed disk drive 875 may be a part of device 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 800 wirelessly via network interface 885.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on device 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 800 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 885 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 820 may operate in conjunction with network interface 885 and/or storage interface 880. The network interface 885 may enable system 800 with the ability to communicate with client devices (e.g., device 105 of FIG. 1), and/or other devices over the network 115 of FIG. 1. Network interface 885 may provide wired and/or wireless network connections. In some cases, network interface 885 may include an Ethernet adapter or Fiber Channel adapter. Storage interface 880 may enable system 800 to access one or more data storage devices. The one or more data storage devices may include two or more data tiers each. The storage interface 880 may include one or more of an Ethernet adapter, a Fiber Channel adapter, Fiber Channel Protocol (FCP) adapter, a SCSI adapter, and iSCSI protocol adapter.

Figure 9:
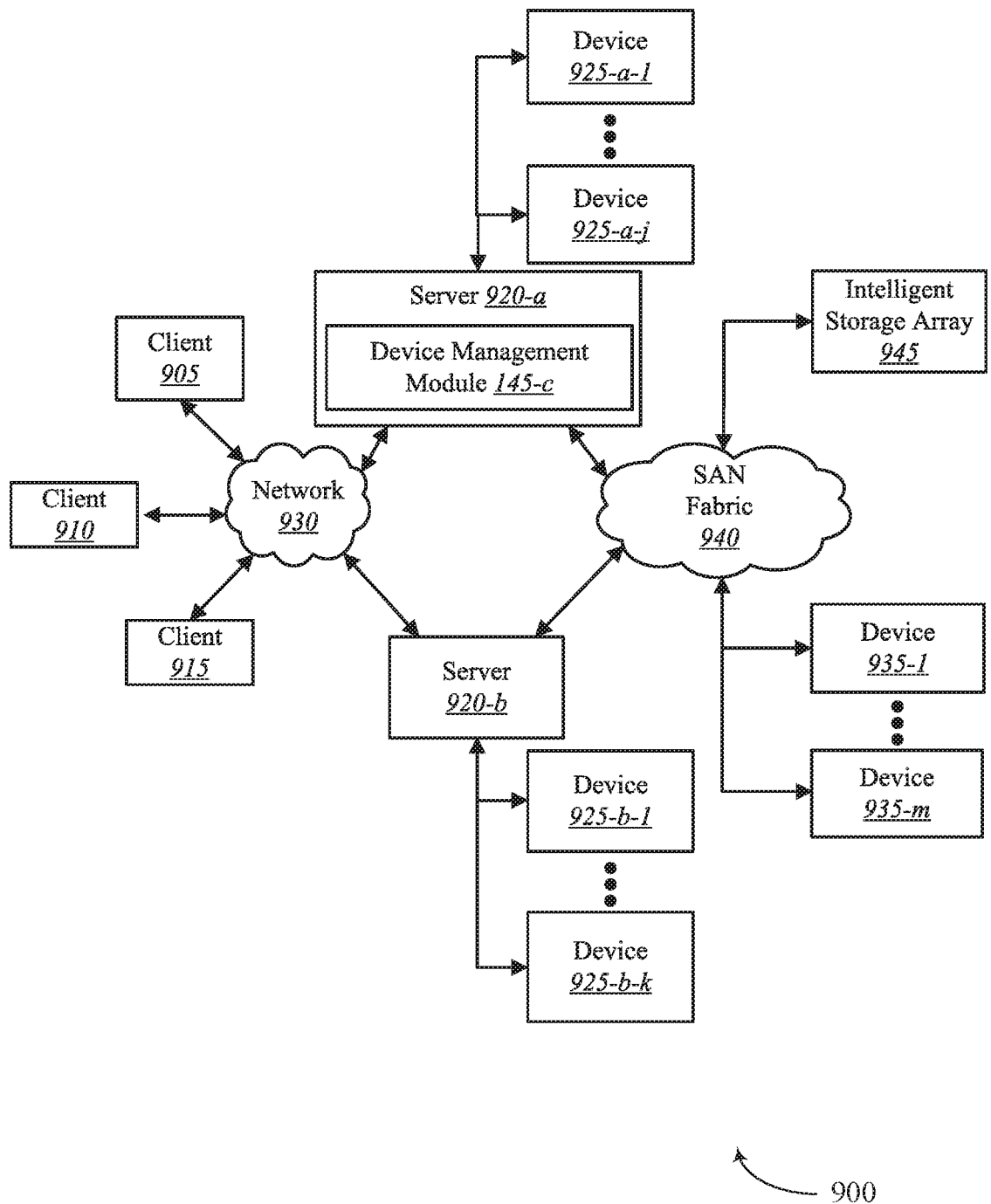
FIG. 9 depicts a block diagram of a computer system suitable for implementing the present systems and methods.

FIG. 9 is a block diagram depicting a network architecture 900 in which client systems 905, 910 and 915, as well as storage servers 920-a and 920-b (any of which can be implemented using computer system 800), are coupled to a network 930. In one embodiment, device management module 145-c may be located within one of the storage servers 920-a, 920-b to implement the present systems and methods. Device management module 145-c may be one example of device management module 145 depicted in FIGS. 1, 2, 3, 4, and/or 7. The storage server 820-*a* is further depicted as having storage devices 825-*a*-1 through 825-*a*-*j* directly attached, and storage server 820-*b* is depicted with storage devices 825-*b*-1 through 825-*b*-*k* directly attached. SAN fabric 840 supports access to storage devices 835-1 through 835-*m* by storage servers 820-*a* and 820-*b*, and so by client systems 805, 810 and 815 via network 830. Intelligent storage array 845 is also shown as an example of a specific storage device accessible via SAN fabric 840.

With reference to computer system 700, network interface 785 or some other method can be used to provide connectivity from each of client computer systems 805, 810 and 815 to network 830. Client systems 805, 810 and 815 are able to access information on storage server 820-*a* or 820-*b* using, for example, a web browser or other client software (not shown). Such a client allows client systems 805, 810 and 815 to access data hosted by storage server 820-*a* or 820-*b* or one of storage devices 825-*a*-1 to 825-*a*-*j*, 825-*b*-1 to 825-*b*-*k*, 835-1 to 835-*m* or intelligent storage array 845. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after invalid authentication attempt while accessing an IoT device. For example, types of security actions may include preventing a user from accessing the IoT device, alerting an administrator to the potential access attempt, quarantine a file related to the connection, delete the file, block a download of the file, and/or warn a user about the application. In addition, the systems described herein may perform a security action on objects other than a file. For example, the systems described herein may blacklist malicious URLs and/or Internet Protocol (IP) addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A computer-implemented method to manage Internet of Things (IoT) devices, at least a portion of the method being performed by a computing device comprising one or more processors, the method comprising:

detecting, via the computing device, a presence of a first IoT device in a network associated with the computing device;

managing, via the computing device, access to the first IoT device based at least in part on authentication information associated with the first IoT device;

searching, via the computing device, a global database for device information associated with the first IoT device, the device information comprising device manufacturer information corresponding to a manufacturer associated with the first IoT device, device update information, or a combination thereof;

identifying, via the computing device, the manufacturer associated with the first IoT device based at least in part on searching the global database for the device information, wherein the global database is remote from the computing device;

identifying, via the computing device that comprises a router and based at least in part on searching the global database for the device information, one or more updates associated with the first IoT device that comprise a software update, a firmware update, or both, the global database including the device manufacturer information and the device update information, wherein identifying the one or more updates associated with the first IoT device comprises:

identifying a current software version and a current firmware version associated with the first IoT device; and monitoring for available updates to the current software version and the current firmware version associated with the first IoT device;
transmitting a notification of the one or more updates to a user associated with the first IoT device; and
applying, via the computing device, at least one update to the first IoT device based at least in part on identifying the one or more updates and a response to the notification of the one or more updates.

2. The method of claim 1, wherein detecting the presence of the first IoT device further comprises:
receiving a packet stream associated with the first IoT device;
analyzing the packet stream to determine one or more identifiers associated with the first IoT device; and
identifying the first IoT device based at least in part on the one or more determined identifiers.

3. The method of claim 2, wherein the one or more identifiers comprise at least one of: a protocol associated with the packet stream, a source media access control (MAC) address associated with the packet stream, a destination MAC address associated with the packet stream, a server address associated with the packet stream, a Domain Name System (DNS) associated with the packet stream, a device certificate associated with the first IoT device, a server certificate associated with the first IoT device, the manufacturer associated with the first IoT device, a type of the first IoT device, or any combination thereof.

4. The method of claim 2, further comprising:
identifying a Dynamic Host Configuration Protocol (DHCP) request associated with the first IoT device prior to receiving the packet stream; and
determining metadata associated with the DHCP request, wherein identifying the first IoT device is based at least in part on the determined metadata.

5. The method of method of claim 2, further comprising:
identifying the manufacturer associated with the first IoT device based at least in part on the one or more identifiers;
determining whether one or more details associated with the manufacturer are stored in the computing device; and
in response to determining that the one or more details associated with the manufacturer are not stored in the computing device, querying the global database to determine the one or more details associated with the manufacturer, wherein the device manufacturer information comprises the one or more details associated with the manufacturer.

6. The method of claim 1, further comprising:
managing access to a second IoT device based at least in part on authentication information associated with the second IoT device, wherein the first IoT device is from a first manufacturer and the second IoT device is from a second manufacturer different from the first manufacturer.

7. The method of claim 1, further comprising:
transmitting a pairing request in the network associated with the computing device; and
receiving a response to the pairing request from the first IoT device, wherein detecting the presence of the first IoT device is based at least in part on the received response.

8. The method of claim 1, wherein managing access to the first IoT device further comprises:
generating a username and a password associated with the first IoT device;
transmitting the generated username and password to the user associated with the first IoT device;
receiving, from the user associated with the first IoT device, an access request for the first IoT device, wherein the access request comprises a username and a password; and
providing access to the first IoT device based at least in part on the username and the password included in the received access request matching with the generated username and password.

9. The method of claim 8, further comprising:
requesting the user associated with the first IoT device to update the username and the password;
in response to the request, receiving an updated username and password associated with the first IoT device; and
providing access to the first IoT device based at least in part on the username and the password included in the received access request matching with the updated username and password.

10. The method of claim 8, further comprising:
determining that a threshold time has passed after generating the username and the password associated with the first IoT device;
updating the username and the password associated with the first IoT device based at least in part on the determining; and
transmitting the updated username and password to the user associated with the first IoT device.

11. The method of claim 1, wherein managing access to the first IoT device further comprises a 2-factor authentication associated with the first IoT device, and wherein the computing device managing the first IoT device is a data network device that includes a router agent associated with an intranet, an internet, or both.

12. The method of claim 1, wherein monitoring for available updates further comprises querying the global database to identify the one or more updates associated with the first IoT device.

13. The method of claim 1, wherein the notification comprises an indication of availability of the one or more updates, further comprising:
receiving the response from the user, the response comprising an approval to apply the at least one update to the first IoT device, wherein applying the at least one update is based at least in part on the received response.

14. A computing device to manage Internet of Things (IoT) devices, comprising:
one or more processors;
memory in electronic communication with the one or more processors, wherein the memory stores computer executable instructions that when executed by the one or more processors cause the one or more processors to perform the steps of:
detecting a presence of a first IoT device in a network associated with the computing device;
managing access to the first IoT device based at least in part on authentication information associated with the first IoT device;
searching a global database for device information associated with the first IoT device, the device information comprising device manufacturer information corresponding to a manufacturer associated with the first IoT device, device update information, or a combination thereof;
identifying the manufacturer associated with the first IoT device based at least in part on searching the global database for the device information, wherein the global database is remote from the computing device;

identifying one or more updates associated with the first IoT device that comprise a software update, a firmware update, or both based at least in part on searching the global database, wherein the computing device comprises a router, wherein identifying the one or more updates associated with the first IoT device comprises:

identifying a current software version and a current firmware version associated with the first IoT device; and monitoring for available updates to the current software version and the current firmware version associated with the first IoT device;

transmitting a notification of the one or more updates to a user associated with the first IoT device; and applying at least one update to the first IoT device based at least in part on identifying the one or more updates and a response to the notification of the one or more updates.

15. The computing device of claim 14, wherein the instructions executed by the one or more processors cause the one or more processors to perform the steps of:

receiving a packet stream associated with the first IoT device;

analyzing the packet stream to determine one or more identifiers associated with the first IoT device; and identifying the first IoT device based at least in part on the one or more determined identifiers.

16. The computing device of claim 15, wherein the one or more identifiers comprise at least one of: a protocol associated with the packet stream, a source media access control (MAC) address associated with the packet stream, a destination MAC address associated with the packet stream, a server address associated with the packet stream, a Domain Name System (DNS) associated with the packet stream, a device certificate associated with the first IoT device, a server certificate associated with the first IoT device, a manufacturer associated with the first IoT device, a type of the first IoT device, or any combination thereof.

17. The computing device of claim 15, wherein the instructions executed by the one or more processors cause the one or more processors to perform the steps of:

identifying a Dynamic Host Configuration Protocol (DHCP) request associated with the first IoT device prior to receiving the packet stream; and determining metadata associated with the DHCP request, wherein identifying the first IoT device is based at least in part on the determined metadata.

18. A non-transitory computer-readable storage medium storing computer executable instructions that when executed by one or more processors cause the one or more processors to perform the steps of:

detecting a presence of a first IoT device in a network associated with a computing device;

managing access to the first IoT device based at least in part on authentication information associated with the first IoT device;

searching a global database for device information associated with the first IoT device, the device information comprising device manufacturer information corresponding to a manufacturer associated with the first IoT device, device update information, or a combination thereof;

identifying the manufacturer associated with the first IoT device based at least in part on searching the global database for the device information, wherein the global database is remote from the computing device;

identifying, via the computing device that comprises a router and based at least in part on searching the global database for the device information, one or more updates associated with the first IoT device that comprise a software update, a firmware update, or both, the global database including the device manufacturer information and the device update information, wherein identifying the one or more updates associated with the first IoT device comprises:

identifying a current software version and a current firmware version associated with the first IoT device; and monitoring for available updates to the current software version and the current firmware version associated with the first IoT device;

transmitting a notification of the one or more updates to a user associated with the first IoT device; and applying at least one update to the first IoT device based at least in part on identifying the one or more updates and a response to the notification of the one or more updates.

19. The computer-program product of claim 18, wherein the instructions executed by the one or more processors cause the one or more processors to perform the steps of:

receiving a packet stream associated with the first IoT device;

analyzing the packet stream to determine one or more identifiers associated with the first IoT device; and identifying the first IoT device based at least in part on the one or more determined identifiers.

\* \* \* \* \*